Figure 1:
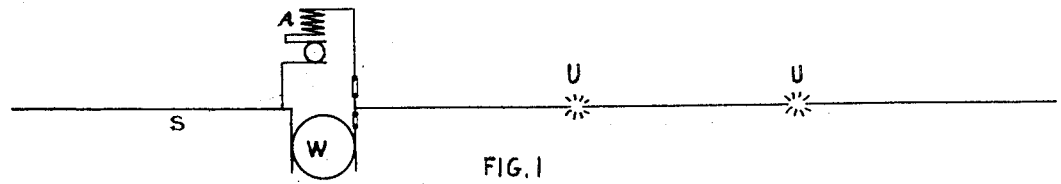

(No Model.)

R. M. HUNTER.
REGULATOR FOR ELECTRIC MOTORS.

No. 579,063.  Patented Mar. 16, 1897.

Attest

Inventor.

UNITED STATES PATENT OFFICE.

RUDOLPH M. HUNTER, OF PHILADELPHIA, PENNSYLVANIA, ASSIGNOR TO THE GENERAL ELECTRIC COMPANY, OF NEW YORK.

REGULATOR FOR ELECTRIC MOTORS.

SPECIFICATION forming part of Letters Patent No. 579,063, dated March 16, 1897.

Original application filed May 22, 1894, Serial No. 512,052. Divided and this application filed January 13, 1896. Serial No. 575,197. (No model.)

*To all whom it may concern:*

Be it known that I, RUDOLPH M. HUNTER, of the city and county of Philadelphia and State of Pennsylvania, have invented an Improvement in Regulators for Electric Motors, of which the following is a specification.

My invention has reference to regulators for electric motors; and it consists of certain improvements which are set forth in the following specification and shown in the accompanying drawings, which form a part thereof.

This application (Case No. 286) is a division of my application, Serial No. 512,052, filed May 22, 1894, and has particular reference to means to control a current flowing through an electric motor for the purpose of varying its speed and power.

The principle involved in my improved regulator comprehends the varying of a counter electromotive force in a shunt-circuit around the motor to be regulated and independent of that of the power-motor to control the current flowing through the said power-motor.

In carrying out my invention I employ a regulating device in the form of a small motor, which may have an armature and field relatively movable with respect to each other, whereby they may have a greater or less amount of wire or conductors in inductive relation relatively one to the other for the purpose of varying the counter electromotive force which may be produced thereby.

In my preferred construction of regulator shown in the parent application the field-magnets are stationary and the armature is made movable in the direction of its axis, so that a greater or less quantity of the wire of said armature may be brought into inductive relation with the poles of the field-magnets. The armature is adapted to revolve freely and to perform no other work than to rotate itself, and consequently it responds to the smallest current. Its speed may be exceedingly great. The advantage of this great speed is that the armature may be made small and have few conductors, because the counter electromotive force is proportional to the speed and may therefore be caused to equal the initial electromotive force of the line-circuit without difficulty. I prefer to employ in connection with the movable armature a suitable switch, which shall properly control the circuits of the regulator to give the greatest amount of resistance prior to its obtaining its speed or when putting the regulator into operation, so as to prevent an excess of current passing through the coils of the regulator before it is in operation to generate a counter electromotive force sufficient to be self-protecting. It will be readily understood that as the armature revolves freely no current can be passed through the armature sufficient to endanger it, because an abnormal increase of current instantly produces a correspondingly-increased speed and production of the necessary counter electromotive force to shut off the passage of what would otherwise be a dangerous current. As the counter electromotive force in the regulator increases, the speed of the power-motor is increased, and vice versa. This is especially useful on constant-current circuits. There are many modifications possible under the general construction embodying the principles of my invention, and these will be better understood by reference to the accompanying drawings, in which—

Figure 2:
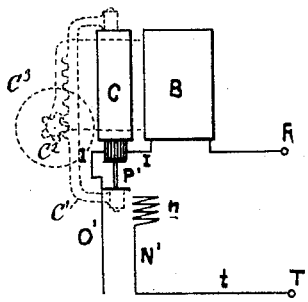
Figure 3:
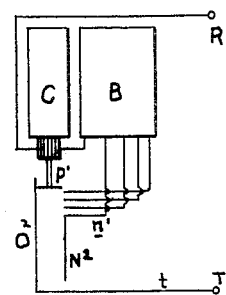
Figure 4:
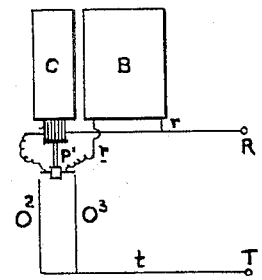
Figure 5:
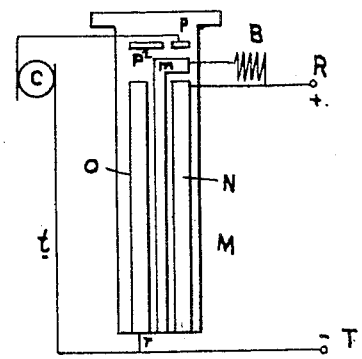

Figure 1 is a diagram illustrating my invention applied to a motor on a constant-current circuit or one in which the translating or current-consuming devices are arranged in series with each other. Figs. 2, 3, and 4 are diagrams illustrating modifications of the regulator-circuits, and Fig. 5 is a diagrammatic view of the switch for controlling the regulator.

B are the field-magnets and are preferably stationary. These field-magnets may be made in any suitable manner desired.

C is an armature and revolves freely in suitable bearings.

In the construction shown in Fig. 1 we have the main conductor of energy S, containing the power-motor W, and current consuming or translating devices U in series with each other, such as are on arc-circuits. The regulator A in this case is in shunt relation with the power-motor W, and its action should be inversely proportional to the action taking place with the motor W—that is to say, an increase of speed in the armature of the regulator increases the speed of the power-motor W, as it opposes to a greater extent the flow of current in the shunt-circuit around the power-motor. In this construction when the power-motor W has obtained its maximum speed the regulator might be cut out of circuit by any of the suitable switch devices shown, but if a variable speed is required to the power-motor W or a constant speed for a variable load the regulator must remain in operation and be adjusted to suit the requirements of the case. My improved method of regulating motors in this manner is particularly advantageous in connection with large power-motors on constant-current circuits, as there are no movable contacts or switches to be operated during the normal operation of the motor.

The regulator A is in effect a small high-speed motor whose function is to generate a counter electromotive force adapted to control the shunting of more or less current of the line S around the power-motor W. It is immaterial how the speed of its armature is varied, but in this case I contemplate shifting the armature longitudinally between the poles of the field-magnets to vary the inductive capacity, as clearly disclosed and claimed in the parent application, of which this is a division.

I have not deemed it necessary in this application to show all the details of the regulator, and hence have illustrated it diagrammatically.

I have indicated hand-controlled devices for moving the armature and switches in dotted lines in Fig. 2, however, but do not confine myself to these details.

Referring now to some of the modifications of my invention, Fig. 2 illustrates the field-magnet coils B in series with the armature C and a contact P' operating with the armature to control the current passing through the field-magnets and armature by means of the contact-strips O' and N' and resistances $n$. Upon lowering the armature the circuit will be closed through the resistances $n$, and a slight further lowering of the armature successively cuts out these resistances, and when the speed is secured the armature is connected, through parts O', P', and N', directly with the main circuit and in shunt relation to the power-motor W.

As shown in Fig. 2, the armature is journaled in an adjustable frame C', guided upon suitable guides upon the field-magnets B, and is provided with a rack with which a pinion $C^2$ meshes, the latter being rotated by a hand-wheel $C^3$. By turning the hand-wheel the armature is raised or lowered and thus shifted relatively to the poles of the field-magnets and hence made to generate any desired counter electromotive force.

In Fig. 3 we have the field-magnets and armature in series, as before; but in this case the field-magnet coils are connected at intervals to terminals $n'$ and $N^2$, which are brought successively into electrical connection with the contact-strip $O^2$ by the contact-switch P', operated by the armature C. As shown, the circuit is broken, and as armature C is lowered the current is first sent through all of the field-magnet coils B to obtain the greatest resistance, and gradually the said coils are cut out until only a small quantity of said coils are maintained in circuit by the contact-strip $N^2$, which is of a length sufficient to permit the full raising and lowering of the armature C into and out of inductive relation with the field-magnets. The construction in Fig. 3 differs from that of Fig. 2 in the field-coils B being so made as to cause current passing through the resistances to aid in producing the magnetic field to generate a counter electromotive force.

In the construction shown in Fig. 4 we have the armature C in permanent shunt relation with the field-coils B, the said field-coils being in a shunt-circuit $r$. The contact-switch P' may move with the armature C and operate in connection with the contact-strips $O^2$ $O^3$, so as to maintain the armature and field-coils in shunt relation, but to close the circuit through the field-coils slightly in advance of the armature for the purpose of producing a magnetic field before any current is sent through the low-resistance armature. In this case the field-coils may be of much higher resistance than the armature.

By examining Fig. 5 it will be observed that the current comes from a positive circuit R and then passes through the field-magnets B of the regulator to a contact $m$ upon the frame M. Immediately below the upper portion of the contact $m$ is a contact-strip N, and parallel to it is a second contact-strip O. The contact-strip N is directly connected with the positive terminal R, and the parallel contact-strip O is connected with the negative terminal T. P $P^2$ are two contacts, the contact P of which connects with one of the brushes of the armature C, and the other brush of said armature connects with a flexible conductor $t$, leading to the negative terminal T. The contact P in descending with the armature first closes the circuit with the contact-block $m$ and then with the contact-strip N. The contact $P^2$, on the other hand, has no connection directly with any of the circuits, but in descending simultaneously with the contact P closes a circuit between the parts $m$ and O. The operation of these circuits will now be understood. When no current is flowing, the several parts are in the relation shown in Fig. 5. As the armature C is lowered slightly and when the contact P comes into connection with the parts $m$ the electric circuit is closed through the field-magnets B and armature C in series. If the field-magnets are of high resistance, as I prefer to make them, a limited amount of current alone will be permitted to flow, and while this would not be sufficient to impart to the armature any great power it is sufficient to give it a considerable speed, inasmuch as it is doing practically no work. The speed having thus been secured, the further lowering of the armature moves the contact P off of the contact part m onto the contact-strip M, and simultaneously therewith the contact $P^2$ closes the circuit between the parts m and O. This instantly throws the field-magnet coils B of the regulator into parallel or shunt relation with respect to the armature. The armature C will, when this action is secured, be in practically its best condition for inductive action by the field, and the speed may then be brought to a maximum with the generation of the largest counter electromotive force and when practically no current is flowing through the regulator and the whole current is passing through the power-motor W. If it is desired to permit some current to flow, the armature is lowered to remove it to a greater or less extent out of inductive relation with the field, so as to lower its speed and counter electromotive force. In all of the subsequent adjustments the field-magnets are kept in shunt relation relative to the armature.

While I prefer the construction shown, I do not limit myself to the details thereof, as they may be modified in various ways without departing from the principles of my invention.

Having now described my invention, what I claim as new, and desire to secure by Letters Patent, is—

1. The combination of a line-circuit, an electric-power motor in said circuit, and a variable counter-electromotive-force generator interposed in the line-circuit in shunt relation to the power-motor and generating a counter electromotive force opposed to the initial electromotive force of the line-circuit consisting of a revolving armature, field-magnets for producing a field in the vicinity of the armature, and means for shifting the armature relative to the field or vice versa for producing a variation in the inductive relation between the armature and the field-magnets.

2. The combination of a line-circuit, an electric-power motor in said circuit, a variable counter-electromotive-force generator interposed in the line-circuit in shunt relation to the power-motor and generating a counter electromotive force opposed to the initial electromotive force of the line-circuit consisting of a revolving armature, field-magnets for producing a field in the vicinity of the armature, means for shifting the armature relative to the field or vice versa for producing a variation in the inductive relation between the armature and the field-magnets, and switch devices for throwing the armature and field first into series and then into parallel connection whereby the greatest resistance is secured at starting.

3. The combination of a constant-current circuit and power-motor arranged in said circuit, a revolving electromagnetic element in parallel with said power-motor, a magnetic field in the vicinity of said revolving electromagnetic element, and a switch for controlling the current delivered to the electromagnetic element and also for varying its speed of revolution, whereby the current in the power-motor may be regulated by the variable counter electromotive force in the regulator.

4. The combination of an electric circuit and power-motor arranged in said circuit, and a counter-electromotive-force regulator wholly independent of the field of the power-motor and arranged in a shunt-circuit about the entire power-motor.

5. The combination of an electric circuit and power-motor arranged in said circuit, a counter-electromotive-force regulator arranged in a shunt-circuit about the power-motor, and a hand-controlled device for varying the counter electromotive force produced in the counter-electromotive-force regulator, whereby the speed of the power-motor may be varied at will.

6. The herein-described method of regulating the speed of an electric-power motor on a constant-current circuit, consisting in maintaining the motor in series with other translating devices and supplying it with electricity from a circuit of constant current, producing a shunted path for the current having ohmic resistance about the armature of the power-motor, and producing in said shunted path a variable counter electromotive force to assist the ohmic resistance to a greater or less extent in opposing the passage of the current through the shunted path, and thereby vary within wide limits and without appreciable loss the current passing through the power-motor.

7. The herein-described method of regulating the speed of an electric-power motor on a constant-current circuit, consisting in maintaining the motor in series with other translating devices and supplying it with electricity from a circuit of constant current, producing a shunted path for the current having ohmic resistance about the armature of the power-motor, varying the ohmic resistance of said shunted path by hand regulation, and producing in said shunted path a variable counter electromotive force simultaneously with the variation of the ohmic resistance and inversely to it to assist the ohmic resistance to a greater or less extent in opposing the passage of the current through the shunted path, and thereby vary within wide limits and without appreciable loss the current passing through the power-motor.

In testimony of which invention I hereunto set my hand.

R. M. HUNTER.

Witnesses:
ERNEST HOWARD HUNTER,
R. M. KELLY.